United States Patent Office 3,241,798
Patented Mar. 22, 1966

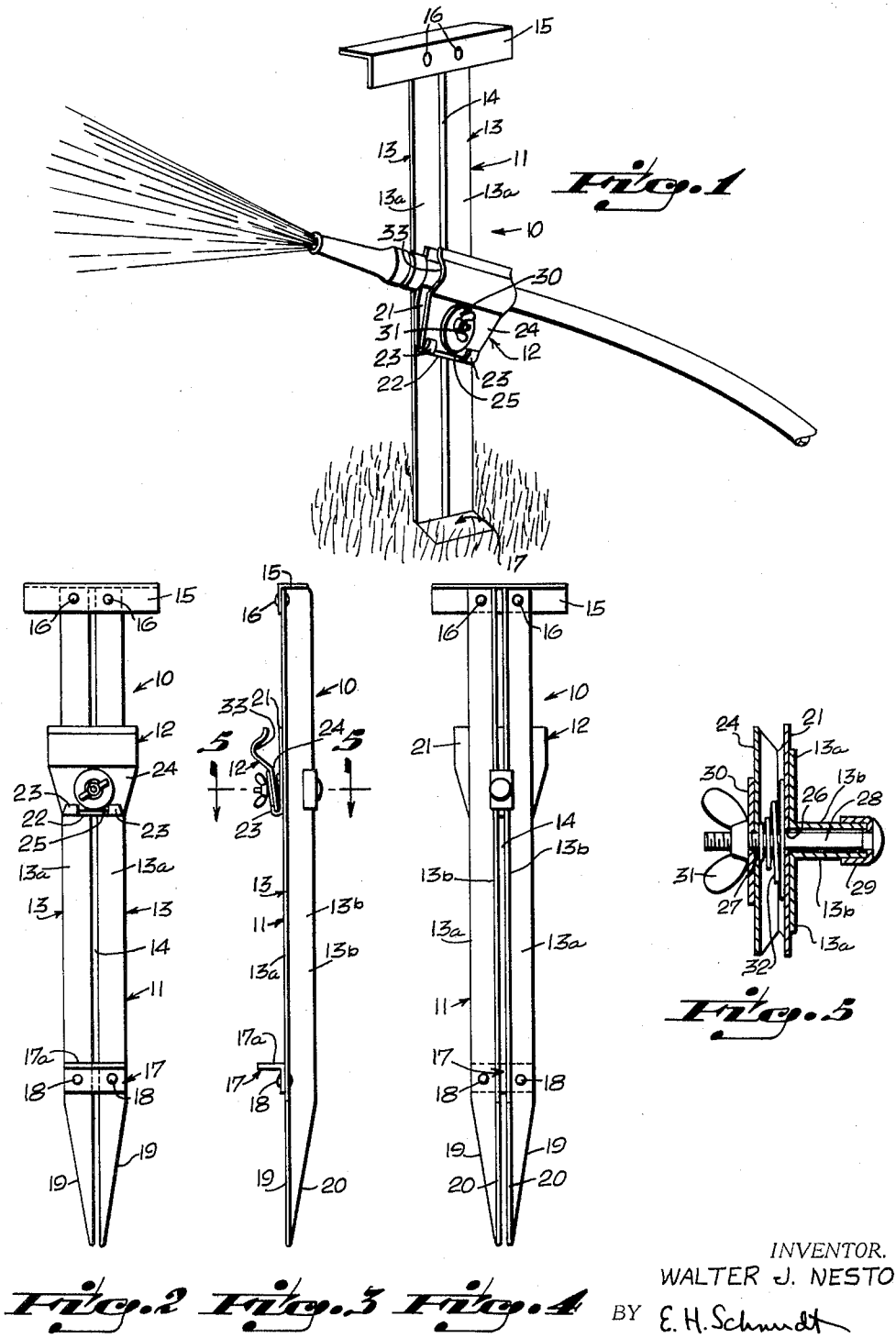

3,241,798
HOLDER FOR WATERING HOSES
Walter J. Nestor, 185 NE. 89th St., El Portal, Fla.
Filed Sept. 3, 1964, Ser. No. 394,131
4 Claims. (Cl. 248—88)

This invention relates generally to garden tools and is directed particularly to a holder for clamping the nozzle end of a watering hose in adjusted fixed position for continuously watering selected areas either at ground level, or above ground, such as when watering bush or tree foliage.

Hose holder implements for use as a gardening aid are known. Such implements as have heretofore been devised, however, have been commercially successful only to a very limited degree. Their lack of public acceptance is believed to be due to their complexity and use of intricate machined parts, which necessarily result in a high cost to the purchasing public.

It is accordingly the principal object of this invention to provide a holder for watering hoses that can readily be assembled, for the most part, from standard extruded aluminum stock, and wherein the various components of the assembly can be produced by simple cutting and bending operations.

A more particular object is to provide a hose holder of the above nature comprising an elongated stake member adapted to be pushed into the ground and providing a longitudinal slot adjustably positioned along which is a clamp member operative to hold a hose in adjusted position against the stake member. In a preferred embodiment of my invention, the stake member is comprised of two lengths of extruded aluminum stock of right-angular cross-section held in spaced relation to define a central longitudinal slot by a transverse handle member at the upper end and a transverse foot piece near the lower end, the lower ends being pointed to facilitate pushing into the ground for anchoring.

Other objects are to provide a holder device of the character described which will be simple in structure, light in weight, attractive in appearance, durable in use, and well adapted to its purpose of holding watering hoses in various adjusted positions for selective watering.

Other objects, features and advantages of the invention will be apparent from the following description when read with reference to the accompanying drawings. In the drawings, wherein like reference numerals denote corresponding parts throughout the several views:

FIG. 1 is a perspective view of a hose holder embodying the invention, shown in use;

FIG. 2 is a front elevational view of the hose holder shown separately;

FIG. 3 is a side elevational view thereof;

FIG. 4 is a back elevational view thereof; and

FIG. 5 is a horizontal cross-sectional view taken along the line 5—5 of FIG. 3 in the direction of the arrows and illustrating constructional details of the clamping mechanism.

Referring now in detail to the drawings, 10 in FIGS. 1, 2, 3 and 4 designates a preferred form of hose holder embodying my invention, the same being comprised, generally, of a stake member 11 and a hose clamp member 12.

The stake member 11 comprises two identical elongated members 13, 13 of right-angular cross-sectional shape, each having web portions 13a, 13b of equal width. The elongated members 13, 13 can conveniently be of standard stock extruded metal, preferably aluminum, and are disposed in spaced, parallel, coextensive relation, with their web portions 13a, 13a lying substantially in a common plane, and with their web portions 13b, 13b defining a central slot 14.

The elongated members 13, 13 are secured in relatively fixed position at their upper ends by a handle member 15, also of a length of extruded metal of right-angular cross-sectional shape, arranged across the upper ends of said elongated members and fixed thereto against the web portions 13a, 13a as by rivets 16, 16. The lower ends of the elongated members 13, 13 are secured together by a transverse foot press member 17 fixed against the web portion 13a, 13a near the lower ends of said elongated members as by rivets 18. The foot press member 17, which also may be of extruded aluminum stock of right-angular cross-section, has an outwardly-extending web portion 17a which serves as a foot press. The lower ends of the elongated members 13, 13 are each brought to a point by beveling their web portions 13a and 13b as indicated at 19 and 20, respectively.

The clamp member 12 comprises a backing plate 21, which may be of polygonal shape, as illustrated, and which is formed at each end of its lower edge 22 with upwardly-bent lugs 23. A metal clamp plate 24, which also may be of polygonal shape, has its lower edge portion 25 hingingly supported behind the lugs 23 for in and out swinging movement with respect to the backing plate 21. The backing plate 21 and the clamp plate 24 are provided in their lower end portions with aligned, central openings 26, 27, respectively, for passage of a carriage bolt 28. The head of the carriage bolt 28 is seated against a U-shaped slide member 29 which straddles the web portions 13b, 13b of the elongated members 13, 13 and passes through an opening therein and through the stake member slot 14 and the openings 26, 27 in the backing plate 21 and clamp plate 24. The threaded outer end of the bolt 28 is fitted with a washer 30 and wing nut 31. A helically-wound compression spring 32 is arranged between the backing plate 21 and clamp plate 24, circumjacent the bolt 28, serving to resiliently urge said clamp plate in the outward-most position permitted by the adjustment of the wing nut 31. The upper end portion of the clamp plate 24 is formed at the inside with a transversely-extending, semi-circular recess 33 for seating engagement with the cylindrical wall of a hose.

In use, the handle member 15 and the foot press member 17 will be used to push the holder into the ground at the desired position. If the earth is soft, the holder can be pushed in until the underside of the web portion 17a of the foot press 17 seats against the ground to limit further penetration and enhance lateral stability, as is illustrated in FIG. 1. The hose end adjacent the nozzle will then be inserted between the backing plate 21 and the clamp plate 24, seated in the recess 33 therein, and clamped in adjusted rotary and vertical position with respect to the stake member 11 by tightening the wing nut 31. Rotary adjustment of the nozzle in a horizontal plane can readily be accomplished by use of the handle 15 and foot press 17 to pull out and reinsert the stake member in any desired position of angular rotation, whereat it will remain by virtue of the right-angular cross-sectional shape of the elongated members 13, 13.

While there is described and illustrated herein only one form in which the invention can conveniently be embodied in practice, it is to be understood that this form is presented by way of example only, and not in a limiting sense. The invention, in brief, comprises all the embodiments and modifications coming within the scope and spirit of the following claims.

What I claim as new and desire to secure by Letters Patent is:

1. A watering hose holder comprising, in combination, a stake member, said stake member comprising a pair of elongated members of right-angular cross-sectional shape having first side wall portions thereof arranged in spaced parallel relation to define a coextensive slot, means securing said elongated members in relatively fixed relation, said elongated members each being pointed at one end of said stake member, a clamp member, and mechanism passing through said slot for adjustably positioning said clamp member along the length of said stake member, said clamp member including means for clamping a watering hose with respect to said stake member.

2. A watering hose holder as defined in claim 1 wherein said securing means comprises an elongated handle member of right-angular cross-section secured transversely to and between said elongated members at the other end of said stake member, and a foot press member secured transversely to and between said elongated members at a position spaced from said one end of said stake member, said foot press member being of right-angular cross-sectional shape and having the outside of one side portion thereof secured against the outsides of second wall portions of said elongated members.

3. A watering hose holder as defined in claim 2 wherein said clamp comprises a backing plate slidably disposed against the outsides of said second wall portions, a clamp plate disposed against the outside of said backing plate, a threaded bolt extending through said slot and openings in said backing plate and said clamp plate, and a wing-nut threadedly received on said bolt for tightening said clamp plate against said backing plate and said clamp member to said stake member.

4. A watering hose holder as defined in claim 3 including means hingingly connecting one edge of said backing plate to one edge of said clamp plate, and a helical compression spring between said backing plate and said clamp plate.

References Cited by the Examiner

UNITED STATES PATENTS

| 663,424 | 12/1900 | Dimock | 248—316 |
| 708,038 | 9/1902 | Harper | 269—99 |
| 2,891,753 | 6/1959 | Bittle | 248—149 |

FOREIGN PATENTS

| 29,956/30 | 2/1932 | Australia. |

CLAUDE A. LE ROY, *Primary Examiner.*

R. P. SEITTER, *Assistant Examiner.*